(12) United States Patent
Liu et al.

(10) Patent No.: US 11,928,419 B2
(45) Date of Patent: Mar. 12, 2024

(54) INFORMATION DISPLAY METHOD AND APPARATUS, AND STORAGE MEDIUM AND ELECTRONIC DEVICE

(71) Applicant: BOE TECHNOLOGY GROUP CO., LTD., Beijing (CN)

(72) Inventors: Pengyu Liu, Beijing (CN); Yingjie Li, Beijing (CN); Liping Lei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/914,409

(22) PCT Filed: Aug. 12, 2021

(86) PCT No.: PCT/CN2021/112348
§ 371 (c)(1),
(2) Date: Sep. 26, 2022

(87) PCT Pub. No.: WO2022/057535
PCT Pub. Date: Mar. 24, 2022

(65) Prior Publication Data
US 2023/0351093 A1    Nov. 2, 2023

(30) Foreign Application Priority Data
Sep. 21, 2020  (CN) .......................... 202010993918.6

(51) Int. Cl.
*G06F 40/109* (2020.01)
*G06F 3/0482* (2013.01)
*G06F 40/169* (2020.01)

(52) U.S. Cl.
CPC .......... *G06F 40/109* (2020.01); *G06F 3/0482* (2013.01); *G06F 40/169* (2020.01)

(58) Field of Classification Search
None
See application file for complete search history.

(56) References Cited

U.S. PATENT DOCUMENTS

| 5,867,174 A | * | 2/1999 | Aoki | ..................... G06T 11/203 |
| | | | | 345/472 |
| 2002/0124029 A1 | * | 9/2002 | Gwinn | .................. G06F 40/109 |
| | | | | 715/269 |

(Continued)

FOREIGN PATENT DOCUMENTS

| CN | 101625848 A | 1/2010 |
| CN | 102789484 A | 11/2012 |

(Continued)

OTHER PUBLICATIONS

"AI Attacks Chinese Calligraphy: Conditional GAN Automatically Generates Chinese Fonts", Jul. 4, 2020, 14 pgs.

(Continued)

*Primary Examiner* — Toan H Vu
(74) *Attorney, Agent, or Firm* — Calfee, Halter & Griswold LLP

(57) ABSTRACT

An information display method and apparatus, and a computer-readable storage medium and an electronic device. The method includes: determining a target font category to be written in response to an operation of a user on a display device page; determining a target font conversion model corresponding to the target font category in a model library, wherein the model library including font conversion models corresponding to a plurality of font categories; in response to a writing operation of the user on the display device page, determining a standard word corresponding to the writing operation according to a writing trajectory of the writing operation, and generating an initial bitmap corresponding to the standard word; and converting the initial bitmap of the standard word into a target bitmap corresponding to the target font category using the target font conversion model and displaying the target bitmap on the display device page.

20 Claims, 5 Drawing Sheets

(56) References Cited

U.S. PATENT DOCUMENTS

| | | | | |
|---|---|---|---|---|
| 2007/0177165 | A1* | 8/2007 | Xie | G06F 3/1206 |
| | | | | 715/205 |
| 2007/0201046 | A1* | 8/2007 | Oda | G06F 40/109 |
| | | | | 358/1.13 |
| 2010/0107062 | A1* | 4/2010 | Bacus | G06F 40/109 |
| | | | | 715/781 |
| 2010/0328694 | A1* | 12/2010 | Horiuchi | G06K 15/02 |
| | | | | 358/1.11 |
| 2011/0249013 | A1* | 10/2011 | Jones | G09G 5/28 |
| | | | | 345/472 |
| 2015/0073779 | A1 | 3/2015 | Ahm | |
| 2016/0314377 | A1* | 10/2016 | Vieira | G06F 40/109 |
| 2017/0192939 | A1* | 7/2017 | Milas | G06T 11/60 |
| 2017/0344521 | A1* | 11/2017 | Takahashi | G06F 40/109 |
| 2018/0052999 | A1* | 2/2018 | Mitola, III | G06F 21/71 |

FOREIGN PATENT DOCUMENTS

| | | |
|---|---|---|
| CN | 104298504 A | 1/2015 |
| CN | 102789484 B | 8/2015 |
| CN | 104978435 A | 10/2015 |
| CN | 106384094 A | 2/2017 |
| CN | 107391015 A | 11/2017 |
| CN | 107644006 A | 1/2018 |
| CN | 104978435 B | 3/2019 |
| CN | 106384094 B | 7/2019 |
| CN | 110597444 A | 12/2019 |
| CN | 111242840 A | 6/2020 |
| CN | 112115678 A | 12/2020 |
| CN | 107391015 B | 3/2021 |
| KR | 20150028627 A | 3/2015 |

OTHER PUBLICATIONS

"Neural Style Transfer for Chinese Fonts", May 17, 2017, 9 pgs.
Written Opinion from PCT/CN2021/112348 dated Oct. 27, 2021.
International Search Report from PCT/CN2021/112348 dated Oct. 27, 2021.

* cited by examiner

INFORMATION DISPLAY METHOD AND APPARATUS, AND STORAGE MEDIUM AND ELECTRONIC DEVICE

CROSS-REFERENCE TO RELATED APPLICATIONS

The present application is a 371 application of PCT Application No. PCT/CN2021/112348, filed Aug. 12, 2021, which claims the benefit of and priority to Chinese Patent Application No. 202010993918.6, filed on Sep. 21, 2020 and titled "INFORMATION DISPLAY METHOD AND APPARATUS, STORAGE MEDIUM AND ELECTRONIC DEVICE", contents of which are incorporated by reference herein in their entireties.

TECHNICAL FIELD

The present disclosure relates to the information presentation technical field, and in particular, to an information presentation method and device, a computer-readable storage medium and an electronic device.

BACKGROUND

With the rapid developments of the touch display field, inputting words on a touch display device with a hand has become more and more widely used.

Most of touch display devices in related art perform display, rendering and optimization for handwriting, but an input and display function for print words has not been integrated, or most of the touch display devices call the font display of the systems themselves. Thus, the existing touch display devices have single style for print words and poor display effect.

Therefore, it is necessary to propose a new information presentation method.

It should be noted that the information disclosed in the background section above is only used to enhance the understanding of the background of the present disclosure, and therefore may include information that does not constitute the prior art known to those skilled in the art.

SUMMARY

According to an aspect of the present disclosure, there is provided an information presentation method, including:
  determining a target font category to be written in response to an operation of a user on a display device page;
  determining a target font conversion model corresponding to the target font category in a model library, wherein the model library includes font conversion models corresponding to a plurality of font categories;
  in response to a writing operation of the user on the display device page, determining a standard word corresponding to the writing operation according to a writing trajectory of the writing operation, and generating an initial bitmap corresponding to the standard word; and
  converting the initial bitmap of the standard word into a target bitmap corresponding to the target font category using the target font conversion model and displaying the target bitmap on the display device page.

In an example embodiment of the present disclosure, before responding to the writing operation of the user on the display device page, the method further includes:
  determining a font size, a font line thickness, a font color and a font inclination angle of the target font category.

In an example embodiment of the present disclosure, in response to the writing operation of the user on the display device page, determining the standard word corresponding to the writing operation according to the writing trajectory of the writing operation, and generating the initial bitmap corresponding to the standard word includes:
  in response to a word writing operation of the user, performing matching in a standard font file library according to the writing trajectory to find a standard word corresponding to the word writing operation; and generating the initial bitmap of the standard word.

In an example embodiment of the present disclosure, generating the initial bitmap of the standard word includes:
  obtaining a vector outline shape of the standard word from the standard font file library; and
  performing rendering according to the vector outline shape to obtain the initial bitmap.

In an example embodiment of the present disclosure, the method further includes:
  in response to an annotation starting operation of a user, determining a to-be-annotated area, and displaying a selection interface for the at least one candidate display font category in the to-be-annotated area.

In an example embodiment of the present disclosure, determining the target font category to be written in response to the selection operation of the user on one category of at least one candidate display font category displayed on the display device page includes:
  in response to a first operation of the user on a font selection interface, presenting the at least one candidate display font category; and
  determining the target font category in response to a touch operation of the user on a category on a presentation interface for presenting the at least one candidate display font category.

In an example embodiment of the present disclosure, the display device page has a font category of an initially displayed font, and a font category of an initially displayed word is a standard font;
  the method further includes:
    in response to a first font conversion operation of the user on the initially displayed word, obtaining a bitmap of the initially displayed word, and determining a first font category corresponding to the first font conversion operation in the candidate display font category;
    determining a first font conversion model corresponding to the first font category in the model library; and
    converting the bitmap of the initially displayed word into a first bitmap corresponding to the first font category using the first font conversion model.

In an example embodiment of the present disclosure, obtaining the bitmap of the initially displayed word in response to the first font conversion operation of the user on the initially displayed word, includes:
  selecting at least one initially displayed word which is to be converted; and
  in response to a font conversion operation of the user on the at least one initially displayed word which is to be converted, obtaining a bitmap of the at least one initially displayed word which is to be converted.

In an example embodiment of the present disclosure, converting the bitmap of the initially displayed word into the first bitmap corresponding to the first font category using the first font conversion model includes:

determining position information of the bitmap of the at least one initially displayed word which is to be converted;

converting the bitmap of the at least one initially displayed word into the first bitmap using the first font conversion model; and arranging at least one first bitmap according to the position information, and replacing, with the arranged first bitmap, the bitmap of the at least one initially displayed word which is to be converted.

In an example embodiment of the present disclosure, after converting the initial bitmap of the standard word into the target bitmap corresponding to the target font category using the target font conversion model and displaying the target bitmap on the display device page, the method further includes:

in response to a second font conversion operation of the user on a target font, obtaining an initial bitmap corresponding to the target bitmap;

determining a second font category corresponding to the second font conversion operation in at least one candidate display font category, and determining a second font conversion model corresponding to the second font category in the model library; and converting the initial bitmap into a second bitmap corresponding to the second font category using the second font conversion model, and replacing the target bitmap.

In an example embodiment of the present disclosure, an input of the font conversion model is a bitmap corresponding to a standard font, and an output of the font conversion model is a bitmap corresponding to a candidate display font category.

According to an aspect of the present disclosure, there is provided an information presentation device, including:

a selection module configured to determine a target font category to be written in response to an operation of a user on a display device page;

a determination module configured to determine a target font conversion model corresponding to the target font category in a model library, wherein the model library includes font conversion models corresponding to a plurality of candidate display font categories;

an input module configured to, in response to a writing operation of the user on the display device page, determine a standard word corresponding to the writing operation according to a writing trajectory of the writing operation, and generate an initial bitmap corresponding to the standard word; and a conversion module configured to convert the initial bitmap of the standard word into a target bitmap corresponding to the target font category using the target font conversion model and displaying the target bitmap on the display device page.

According to an aspect of the present disclosure, there is provided a computer-readable storage medium. When the program is executed by a processor, the processor is caused to perform the information presentation method according to any one of the above embodiments.

According to an aspect of the present disclosure, there is provided an electronic device, including:

a processor; and a memory for storing one or more programs which, when executed by one or more processors, cause the one or more processors to perform the information presentation method according to any one of the above embodiments.

BRIEF DESCRIPTION OF THE DRAWINGS

The accompanying drawing, which are incorporated herein and form a part of the specification, illustrate the embodiments of the present disclosure and, together with the description, further serve to explain the principles of the embodiments of the present disclosure. Obviously, the drawings in the following description are only some embodiments of the present disclosure. For those of ordinary skill in the art, other drawings can be obtained based on these drawings without creative work.

DETAILED DESCRIPTION

Figure 1:
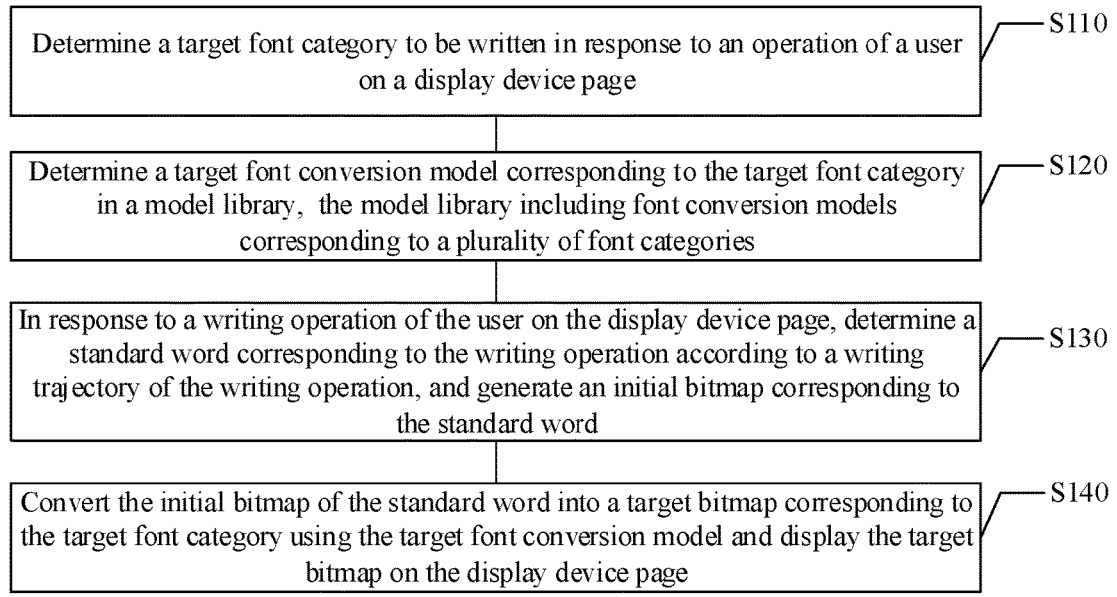
FIG. 1 schematically shows a flowchart of an information presentation method according to an example embodiment of the present disclosure.

Example embodiments will now be described more fully with reference to the accompanying drawings. However, the example embodiments can be implemented in various forms and should not be construed as limited to the examples set forth herein; rather, providing these embodiments makes the present disclosure more comprehensive and complete, and conveys the concepts of the example embodiments comprehensively to those skilled in the art. The described features, structures, or characteristics may be combined in any suitable manner in one or more embodiments.

In addition, the drawings are merely schematic illustrations of the present disclosure and are not necessarily drawn to scale. The same reference numerals in the drawings represent the same or similar parts, and thus repeated descriptions thereof will be omitted. Some block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

In an example embodiment, an information presentation method is first provided. The method may be applied to a display device with an intelligent interactive function, for example, applied to an electronic whiteboard system, where words input by a user on the electronic whiteboard may be converted, using the information presentation method, to a personalized font which is set and selected by the user and the converted font may be displayed. Referring to FIG. 1, the information presentation method may include the following steps:

In S110, a target font category to be written is determined in response to an operation of a user on a display device page.

In S120, a target font conversion model corresponding to the target font category is determined in a model library. The model library includes font conversion models corresponding to a plurality of font categories.

In S130, in response to a writing operation of the user on the display device page, a standard word corresponding to the writing operation is determined according to a writing trajectory of the writing operation, and an initial bitmap corresponding to the standard word is generated.

In S140, the initial bitmap of the standard word is converted into a target bitmap corresponding to the target font category using the target font conversion model and the target bitmap is displayed on the display device page.

As compared with related art, in the information presentation method provided in this example embodiment, when inputting words on a touch display device, a user may first determine a target font category. Then, the target font conversion model in the model library is determined according to the target font category. Using the target font conversion model, the initial bitmap of a standard word corresponding to the user's writing operation is converted into the target bitmap corresponding to the target font category and the target bitmap is displayed on the display device page. On the one hand, versatile fonts can be displayed on the touch display device, and display effects can be improved. On the other hand, the target bitmap of the target font category is generated using the pre-trained font conversion model, without setting a complete target font category library. Thus, the storage pressure on the server is reduced. On the other hand, through the font conversion model can be trained with a small amount of data, and personalized fonts for a variety of users can be designed, thereby avoiding the copyright problem caused by using existing complete font libraries.

Hereinafter, each step of the information presentation method will be described in more detail with reference to the accompanying drawings and embodiments.

In step S110, a target font category to be written is determined in response to an operation of a user on a display device page.

In an example embodiment of the present disclosure, when the user needs to input words on the display device page, a server may determine the target font category to be written in response to the user's operation on the display device page. Specifically, the server may respond to a selection operation on at least one candidate display font category on the display device page, and determines a candidate display font category corresponding to the selection operation as the target font category. The at least one candidate display font category includes at least multiple types, which may be existing fonts or user's personalized font(s), and embodiments of the present disclosure do not impose specific limitations on this.

Figure 2:
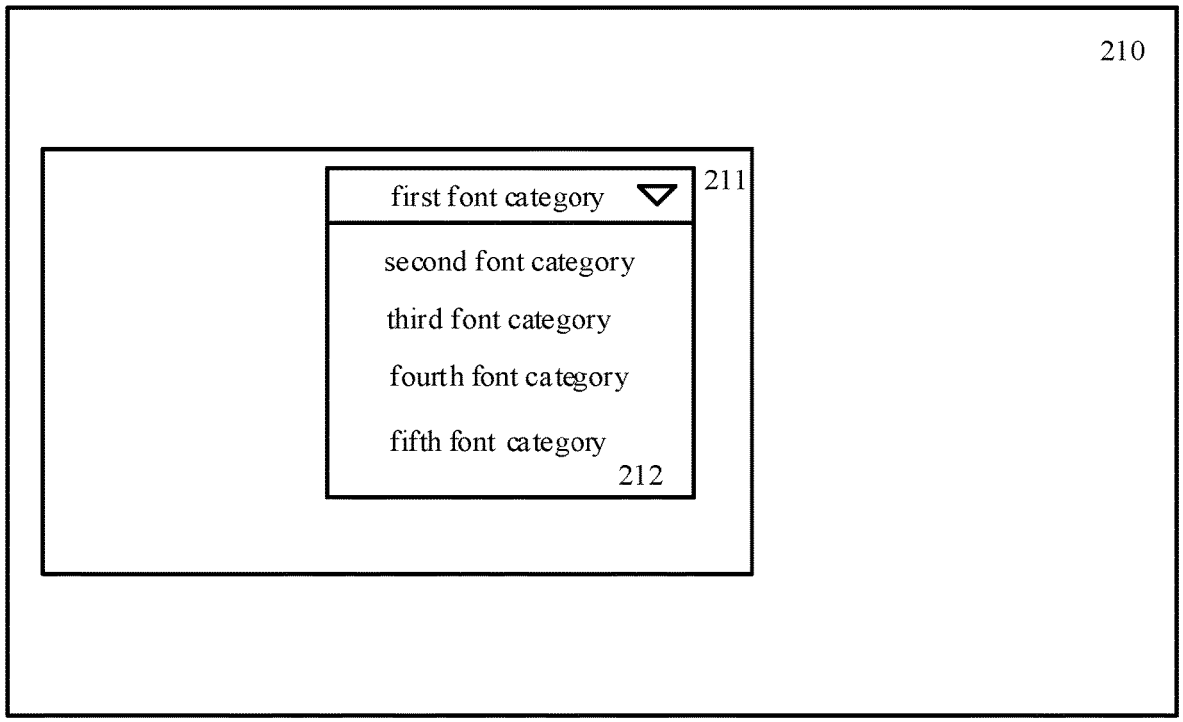
FIG. 2 shows a schematic diagram of a display device page in an annotation scenario according to an example embodiment of the present disclosure.

In an example implementation, referring to FIG. 2, the information presentation method may be applied to an annotation scenario. The server may first respond to an annotation start operation of the user, determine a to-be-annotated area 211 on the display device page 210, and display a selection interface 212 for candidate display font categories on the to-be-annotated area 211. Then, the server may respond to a first operation of the user on the candidate font selection interface 212, and present multiple candidate display font categories. Finally, the server may respond to a touch operation of the user on a category on the interface for presenting the candidate display font categories to determine the target font category.

In another example embodiment of the present disclosure, the font selection interface 212 may be displayed outside the to-be-annotated area 211, and an arrow may be used to indicate that the font selection interface 212 is used for selecting a font category of an annotated word in the to-be-annotated area 211.

It should be noted that there are many ways to select fonts. For example, a variety of candidate display font categories are displayed directly in a preset area of the above-mentioned display device page. The user may select the target font category by tapping, or the user may determine the target font category by voice input. As another example, a correspondence between gestures and candidate font categories is set in the display device, and the user selects different target font categories through different gestures. The selection of the target font category is not specifically limited in embodiments of the present disclosure.

When the method is adopted in the annotation scenario, the confusion between the initially displayed words and the annotation words can be avoided. For example, the user may continue to complete the remaining work after completing the annotation, and the user can clearly distinguish the annotation words from the initially displayed words during playback.

Secondly, the above-mentioned font selection interface can respond to selection operations of different users, that is, multiple users can use different fonts to annotate at the same time. In other words, there may be multiple to-be-annotated areas, and in this case, different users use different fonts to annotate, which can distinguish the annotation words of users well, and meanwhile the method can meet the needs of different users and improve user experience.

In step S120, a target font conversion model corresponding to the target font category is determined in a model library. The model library includes font conversion models corresponding to a plurality of font categories.

Figure 3:
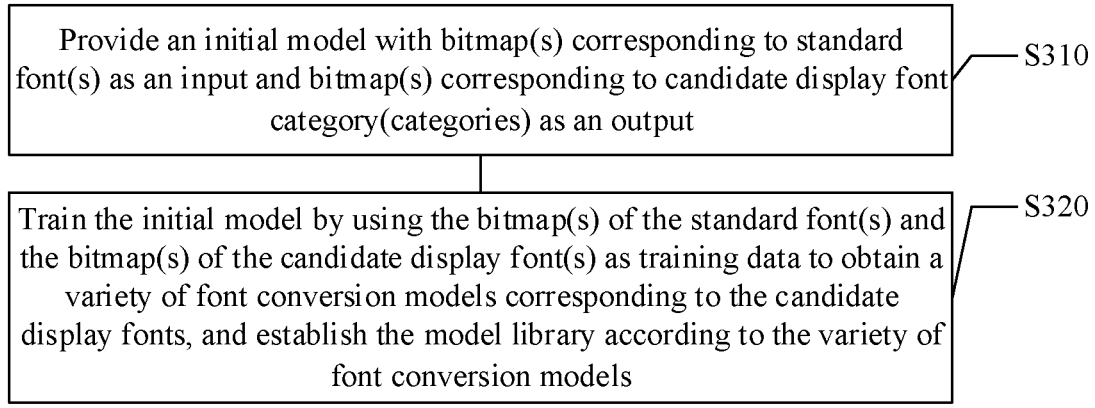
FIG. 3 schematically shows a flow chart of model library obtaining according to an example embodiment of the present disclosure.

Referring to FIG. 3, the model library may be obtained by training an initial model. The following steps S310 to S320 may be included, which are described in detail below:

In step S310, an initial model with bitmap(s) corresponding to standard font(s) as an input and bitmap(s) corresponding to candidate display font category(categories) as an output is provided.

In this example implementation, an initial model may be provided first. The input of the initial model is the bitmap(s) corresponding to the standard font(s), and the output of the initial model is the bitmap(s) corresponding to candidate display font category (or candidate display font categories).

In an example embodiment, the initial model may use a top-down convolutional neural network model, or a fully connected neural network model, a recurrent neural network model, etc., which are not specifically limited in this example embodiment.

In step S320, the initial model is trained by using the bitmap(s) of the standard font(s) and the bitmap(s) of the candidate display font(s) as training data to obtain a variety of font conversion models corresponding to the candidate display fonts, and the model library is established according to the variety of font conversion models.

In an example embodiment, training data may be obtained first. Bitmaps of standard fonts of multiple words and bitmaps of candidate display font categories corresponding to the multiple words may be obtained as training data. The training of the initial model is completed by using the above training, and font conversion models corresponding to multiple candidate display fonts may be obtained. The multiple font conversion models can be encapsulated as the above model library.

Specifically, the bitmaps of the standard fonts of the above multiple words are used as input. Comparison of error between the output and the bitmaps of the candidate display font categories corresponding to the multiple words is made. The loss function adopted by the convolutional neural network of the above initial model is determined, and a loss function value is calculated. Specifically, the MSE loss function may be used to calculate the loss function value. After the calculation of the loss function value is completed, the Momentum algorithm may be used to optimize the convolutional neural network in the initial model and adjust the parameters of the convolutional neural network. The parameters with the smallest loss function value are used as the final parameter values of the convolutional neural network in the initial model, the training of the initial model is completed, and the font conversion model is obtained.

In an example embodiment, the server may perform matching in the model library according to the target font category selected in the above step S110 to find a font conversion model corresponding to the target font category as the target font conversion model.

In step S130, in response to a writing operation of the user on the display device page, a standard word corresponding to the writing operation is determined according to a writing trajectory of the writing operation, and an initial bitmap corresponding to the standard word is generated.

In an example implementation of the present disclosure, the standard font is a font initially displayed on the display device page, which may be commonly used font formats such as SimSun or KaiTi, or can be customized according to user requirements, and embodiments of the present disclosure do not impose specific limitations on this.

In an example embodiment, a bitmap is made up of individual dots of pixels. These dots may be arranged and dyed differently to form a pattern. An initial bitmap is a bitmap corresponding to a standard word.

In an example implementation, the server may respond to the user's writing operation on the display device page, detect the movement trajectory of the writing operation, and determine the standard word(s) corresponding to the writing operation according to the movement trajectory. Specifically, the server may first obtain a standard word file library, obtain the standard word corresponding to the writing trajectory in the standard word file library according to the writing trajectory, and then use the standard word file library to determine a vector outline shape corresponding to the standard word. Then, the standard bitmap of the standard word corresponding to the writing operation is obtained by rendering the vector outline shape.

In an example embodiment, when the user performs a writing operation, a font size, a font line thickness, a font color, etc. of the target font file category may be determined first. The font color may include multiple colors, such as black, red, green, etc., and the font color may also be customized according to requirements, which are not specifically limited in this example embodiments.

In an example embodiment, there may be a plurality of font line thicknesses, or the font line thickness may be customized according to user's needs, which is not specifically limited in this example embodiments. Also, there may be a plurality of font sizes, and related settings of font size in related art may be referred to. Alternatively, the font size may be customized according to requirements, which is not specifically limited in this example embodiment.

In step S140, the initial bitmap of the standard word is converted into a target bitmap corresponding to the target font category using the target font conversion model and the target bitmap is displayed on the display device page.

In an example embodiment of the present disclosure, after obtaining the initial bitmap of the standard font, the target font conversion model may be used to convert the initial bitmap of the standard font into the target bitmap corresponding to the target font category and the target bitmap may be displayed on the display device page.

In an example embodiment of the present disclosure, the font of an initially displayed word on the display device page may be a standard font. When a user needs to convert a font that already exists on the display device page, the server may, in response to the user's selection operation for selecting at least one initially displayed word, obtain bitmaps of the initially displayed words; and, in response to the user's first font conversion operation on the initially displayed words, determine a first font category in the candidate display font categories corresponding to the first font conversion operation, and at the same time determine a first font conversion model corresponding to the first font conversion category in the model library. Then, the server may use the first font conversion model to convert the bitmaps of the plurality of initially displayed fonts into the first bitmaps, respectively. Then, the server may determine the position information of the bitmaps of the initially displayed words, use the position information to arrange the plurality of first bitmaps obtained, and finally replace the bitmaps of the above-mentioned initially displayed words with the arranged first bitmaps to complete the conversion of the initially displayed words.

In an example implementation, the font category of the initially displayed font is a font category configured inside the display device, that is, the above standard font, which may be commonly used font formats such as SimSun and KaiTi, or may be customized according to requirements, and embodiments of the present disclosure do not impose specific limitations on this.

The flow of font conversion for the initially displayed font in the above information presentation method will be further described below through a example embodiment.

Figure 4:
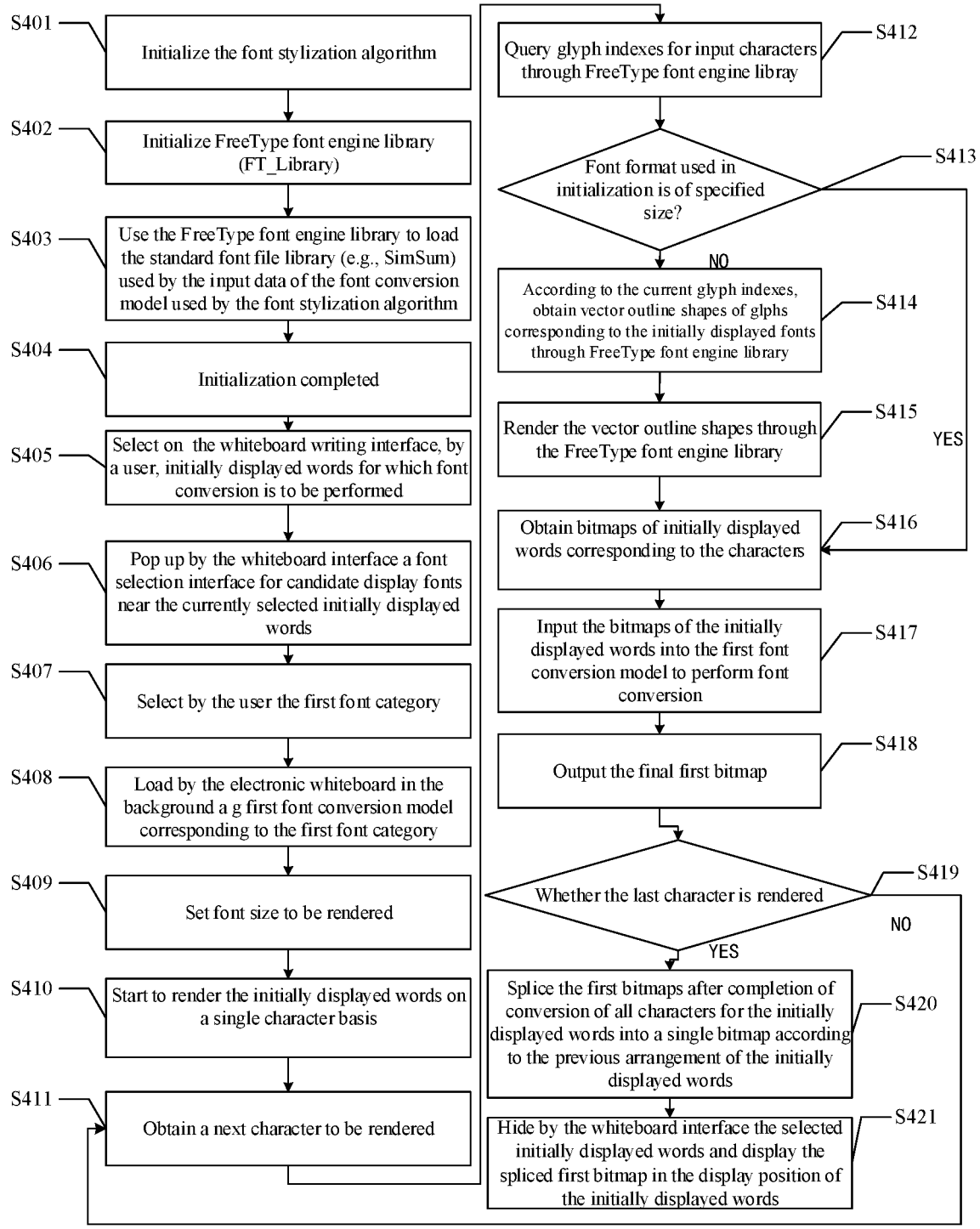
FIG. 4 schematically shows a flow chart of converting an initially displayed word by taking an electronic whiteboard as an example according to an example embodiment of the present disclosure.

Specifically, in this example embodiment, referring to FIG. 4, the situation where the display device is an electronic whiteboard is taken as an example for description. In response to the user's first font conversion operation on the initially displayed font, first, step S401 may be performed. After the electronic whiteboard is started, an initialization process is performed in the background: the font stylization algorithm is initialized. The algorithm uses a font conversion model. During training of the model, the input data of the model is the bitmaps of standard fonts, and the output data is the bitmaps of the desired candidate display fonts, for example, certain calligraphy font images. Then, step S402 may be performed, and the electronic whiteboard initializes the FreeType font engine library (FT_Library) in the background. And, steps S403 and S404 may be performed, and the whiteboard uses the FreeType font engine library to load the font file used by the input data of the font conversion model used by the font stylization algorithm, i.e., the standard font file library, so as to complete the initialization of the electronic whiteboard.

Next, step S405 may be performed, where the user selects the initially displayed words which are to be converted on the whiteboard writing interface. After selection, steps S406 and S407 may be performed, and the whiteboard interface pops up a font selection interface for candidate display fonts near the currently selected words for the user to choose which font (such as calligraphy, KaiTi, handwriting, etc.) to convert the words into, and at the same time a font size selection interface is displayed for the user to select an appropriate font size. After the selection of the first font type and font size is completed, step S408 and step S409 may be performed, the electronic whiteboard loads, in the background, a corresponding first font conversion model according to the first font category selected by the user, and sets the font size for rendering. Specifically, the electronic whiteboard, in the background, sets the size of the first font category in the FreeType font engine library according to the font size to be displayed and selected by the user. Then, steps S410 and S411 may be performed to start the rendering procedure. Then, step S412 may be performed, and the electronic whiteboard, in the background, renders the words which are selected by the user and need to be rendered on a single character basis. For the characters for the input initially displayed words, the whiteboard, in the background, queries glyph indexes corresponding to the characters in the set standard font file library through the FreeType font engine library. Step S413 is performed to determine whether the font format in step S401 is of a specified size. If the font format loaded when the FreeType font engine library is initialized is not a fixed-size font, steps S414 and S415 are then performed, and the vector outline shapes of the glyphs corresponding to the characters are obtained through the FreeType font engine library according to the current glyph indexes. Then, step S416 is performed, and the electronic whiteboard in the background renders the vector outline shapes through the FreeType font engine library to obtain bitmaps of the initial displayed words.

In an example embodiment, a vector outline shape is a vector diagram of a font outline, also known as an object-oriented image or a drawing image, mathematically defined as a series of points connected by lines. Graphical elements in a vector file are called objects. Each object is a self-contained entity with properties such as color, shape, outline, size, and screen position.

If, for example, the font format loaded when the FreeType font engine library is initialized is a fixed-size font, step S416 is directly performed, and the bitmaps of the initially displayed words are obtained through the FreeType font engine library according to the current glyph indexes.

Afterwards, steps S417 and S18 may be performed, and the electronic whiteboard, in the background, inputs the bitmaps of the initial glyphs into the first font conversion model for font conversion to obtain and output the first bitmaps. After the first bitmaps are output, step S419 is performed to determine whether the last character of the initially displayed words is rendered. If the rendering is completed, steps S420 and S421 are performed. The electronic whiteboard in the background performs conversion of all the words in the initially displayed words, and splices the obtained first bitmaps into a single bitmap according to the previous arrangement of the initially displayed words. The whiteboard interface hides the selected initially displayed words and displays the spliced first bitmap in the display position of the initially displayed words. If the rendering is completed, return to step S411 until the conversion of all the initially displayed words is completed.

In an example embodiment of the present disclosure, when a user needs to perform conversion of the font of the obtained target word category, a second font conversion operation of the target font may be obtained, and the initial bitmap corresponding to the target font may be obtained. Since the target bitmap is obtained by converting the initial bitmap using a target font conversion model and the initial bitmap can be stored after conversion, the initial bitmap corresponding to the target bitmap can be directly obtained.

Then, a second font category corresponding to the second word conversion operation may be obtained, a second font conversion model corresponding to the second font category may be determined in the above model library, and the initial bitmap may be converted into a second bitmap by using the second font conversion model to replace the above target bitmap with the second bitmap to complete the word conversion of the target font.

Figure 5:
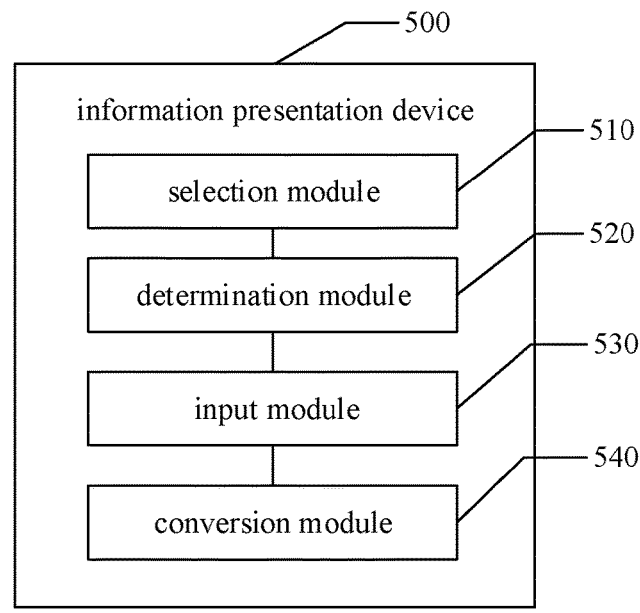
FIG. 5 shows a schematic diagram of the composition of an information presentation device according to an example embodiment of the present disclosure.

The device embodiments of the present disclosure will be introduced below, which can be used to perform the above-mentioned information presentation method of the present disclosure. In addition, in an example embodiment of the present disclosure, an information presentation device is provided. Referring to FIG. 5, the information presentation device 500 includes: a selection module 510, a determination module 520, an input module 530 and a conversion module 540.

The selection module 510 may be configured to determine a target font category to be written in response to an operation of a user on a display device page.

The determination module 520 may be configured to determine a target font conversion model corresponding to the target font category in a model library, wherein the model library includes font conversion models corresponding to a plurality of candidate display font categories.

The input module 530 may be configured to, in response to a writing operation of the user on the display device page, determine a standard word corresponding to the writing operation according to a writing trajectory of the writing operation, and generate an initial bitmap corresponding to the standard word.

The conversion module 540 may be configured to convert the initial bitmap of the standard word into a target bitmap corresponding to the target font category using the target font conversion model and displaying the target bitmap on the display device page.

Since functional modules of the information presentation device of the example embodiments of the present disclosure correspond to steps of the above-mentioned example embodiment of the information presentation method, for details not disclosed in the embodiments of the device of the present disclosure, reference may be made to the above-mentioned description regarding the information presentation method of the present disclosure.

It should be noted that although several modules or units of the devices for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

In addition, an example embodiment of the present disclosure also provides an electronic device capable of implementing the above information presentation.

Those skilled in the art can understand that various aspects of the present disclosure may be implemented as a system, method, or program product. Therefore, various aspects of the present disclosure can be embodied in the following forms: a complete hardware implementation, a complete software implementation (including firmware, microcode, etc.), or a combination of hardware and software, which can be collectively referred to as "circuit", "module", or "system".

An electronic device 600 according to an example embodiment of the present disclosure is described below with reference to FIG. 6. The electronic device 600 shown in FIG. 6 is only an example, and should not impose any limitation on the functions and scope of use of the embodiments of the present disclosure.

Figure 6:
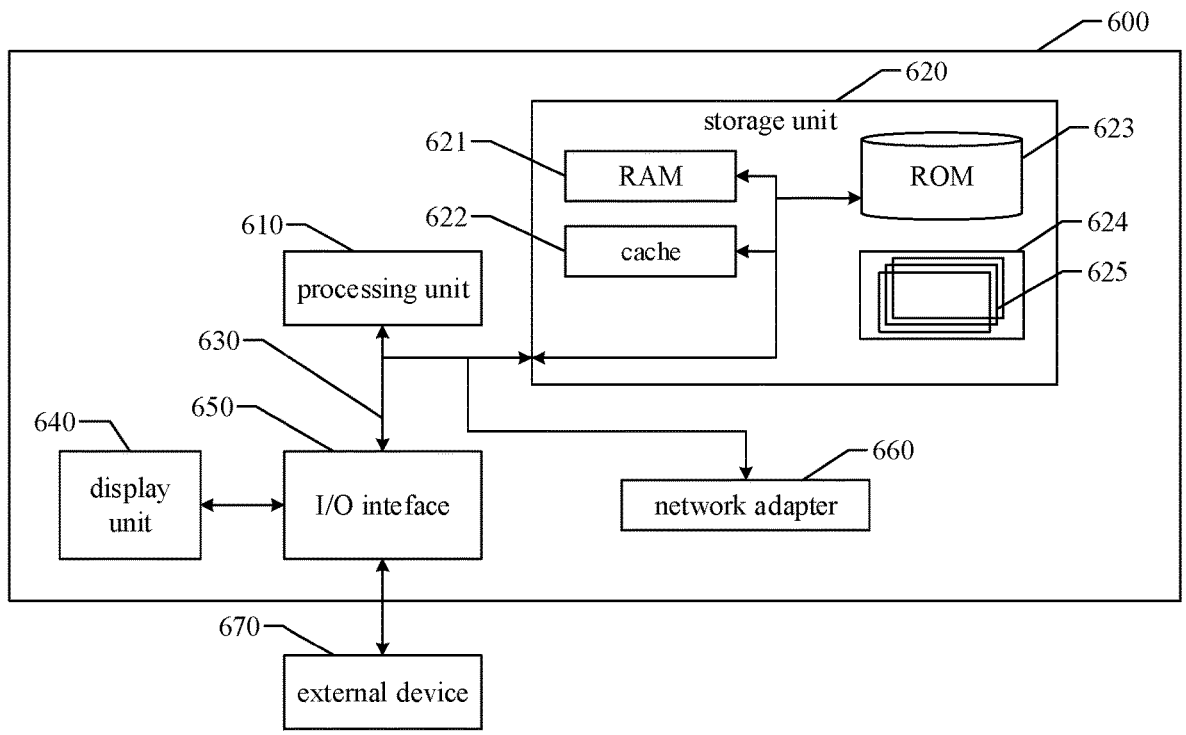
FIG. 6 schematically shows a schematic structural diagram of a computer system suitable for implementing an electronic device according to an example embodiment of the present disclosure.

As shown in FIG. 6, the electronic device 600 is shown in the form of a general-purpose computing device. The components of the electronic device 600 may include, but are not limited to, at least one processing unit 610, at least one storage unit 620, and a bus 630 connecting different system components (including the storage unit 620 and the processing unit 610), and a display unit 640.

The storage unit stores program codes, and the program codes can be executed by the processing unit 610, so that the processing unit 610 executes various example embodiments according to the present disclosure described in the "exemplary methods" section of the present specification. For example, the processing unit 610 may perform the steps shown in FIG. 1. In S110, a target font category to be written is determined in response to an operation of a user on a display device page. In S120, a target font conversion model corresponding to the target font category is determined in a model library. The model library includes font conversion models corresponding to a plurality of font categories. In S130, in response to a writing operation of the user on the display device page, a standard word corresponding to the writing operation is determined according to a writing trajectory of the writing operation, and an initial bitmap corresponding to the standard word is generated. In S140, the initial bitmap of the standard word is converted into a target bitmap corresponding to the target font category using the target font conversion model and the target bitmap is displayed on the display device page.

For another example, the electronic device can implement the various steps shown in FIG. 1 to FIG. 4.

The storage unit 620 may include a readable medium in the form of a volatile storage unit, such as a random access storage unit (RAM) 621 and/or a cache storage unit 622, and may further include a read-only storage unit (ROM) 623.

The storage unit 620 may further include a program/utility tool 624 having a set (at least one) of program modules 625. Such program modules 625 include, but are not limited to, an operating system, one or more application programs, other program modules, and program data. Each or some combination of these examples may include an implementation of a network environment.

The bus 630 may be one or more of several types of bus structures, including a memory unit bus or a memory unit controller, a peripheral bus, a graphics acceleration port, a processing unit, or a local area bus using any bus structure in a variety of bus structures.

The electronic device 600 may also communicate with one or more external devices 670 (such as a keyboard, a pointing device, a Bluetooth device, etc.), and may also communicate with one or more devices that enable a user to interact with the electronic device 600, and/or may also communicate with any device (such as a router, a modem) that can enable the electronic device 600 to interact with one or more other computing devices. Such communication can be performed through an input/output (I/O) interface 650. Moreover, the electronic device 600 may also communicate with one or more networks (such as a local area network (LAN), a wide area network (WAN), and/or a public network, such as the Internet) through the network adapter 660. As shown in the figure, the network adapter 660 communicates with other modules of the electronic device 600 through the bus 630. It should be understood that although not shown in the figure, other hardware and/or software modules may be used in conjunction with the electronic device 900, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various exemplary embodiments of the present disclosure described in the above-mentioned exemplary methods.

Figure 7:
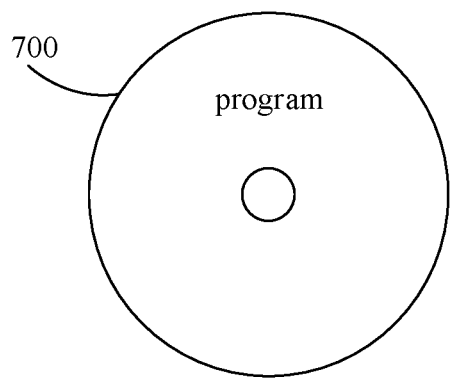
FIG. 7 schematically shows a schematic diagram of a computer-readable storage medium according to some embodiments of the present disclosure.

FIG. 7 shows a program product 700 for implementing the above methods according to an exemplary embodiment of the present disclosure. The program product 1000 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

It is to be understood that the present disclosure is not limited to the precise structures described above and illustrated in the accompanying drawings, and that various modifications and changes may be made without departing from the scope of the present disclosure. The scope of the present disclosure is limited only by the appended claims.

What is claimed is:

1. An information presentation method, comprising:
    determining a target font category to be written in response to an operation of a user on a display device page;
    determining a target font conversion model corresponding to the target font category in a model library, wherein the model library comprises font conversion models corresponding to a plurality of font categories;
    in response to a writing operation of the user on the display device page, determining a standard word corresponding to the writing operation according to a writing trajectory of the writing operation, and generating an initial bitmap corresponding to the standard word; and
    converting the initial bitmap of the standard word into a target bitmap corresponding to the target font category using the target font conversion model and displaying the target bitmap on the display device page.

2. The method according to claim 1, wherein determining the target font category to be written in response to the operation of the user on the display device page comprises:
    determining the target font category to be written in response to a selection operation of the user on one category of at least one candidate display font category displayed on the display device page.

3. The method according to claim 1, wherein before responding to the writing operation of the user on the display device page, the method further comprises:
    determining a font size, a font line thickness, a font color and a font inclination angle of the target font category.

4. The method according to claim 1, wherein in response to the writing operation of the user on the display device page, determining the standard word corresponding to the writing operation according to the writing trajectory of the writing operation, and generating the initial bitmap corresponding to the standard word comprises:
    in response to a word writing operation of the user, performing matching in a standard font file library according to the writing trajectory to find a standard word corresponding to the word writing operation; and
    generating the initial bitmap of the standard word.

5. The method according to claim 4, wherein generating the initial bitmap of the standard word comprises:
    obtaining a vector outline shape of the standard word from the standard font file library; and
    performing rendering according to the vector outline shape to obtain the initial bitmap.

6. The method according to claim 2, further comprising:
    in response to an annotation starting operation determining a to-be-annotated area, and displaying a selection interface for the at least one candidate display font category in the to-be-annotated area.

7. The method according to claim 6, wherein determining the target font category to be written in response to the selection operation of the user on one category of at least one candidate display font category displayed on the display device page comprises:
    in response to a first operation on a font selection interface, presenting the at least one candidate display font category; and
    determining the target font category in response to a touch operation on a category on a presentation interface for presenting the at least one candidate display font category.

8. The method according to claim 1, wherein the display device page has a font category of an initially displayed font, and a font category of an initially displayed word is a standard font;
    wherein the method further comprises:
    in response to a first font conversion operation of the user on the initially displayed word, obtaining a bitmap of the initially displayed word, and determining a first font category corresponding to the first font conversion operation in the candidate display font category;

determining a first font conversion model corresponding to the first font category in the model library; and converting the bitmap of the initially displayed word into a first bitmap corresponding to the first font category using the first font conversion model.

9. The method according to claim 8, wherein obtaining the bitmap of the initially displayed word in response to the first font conversion operation of the user on the initially displayed word, comprises:

selecting at least one initially displayed word which is to be converted; and in response to a font conversion operation on the at least one initially displayed word which is to be converted, obtaining a bitmap of the at least one initially displayed word which is to be converted.

10. The method according to claim 9, wherein converting the bitmap of the initially displayed word into the first bitmap corresponding to the first font category using the first font conversion model comprises:

determining position information of the bitmap of the at least one initially displayed word which is to be converted;

converting the bitmap of the at least one initially displayed word into the first bitmap using the first font conversion model; and arranging at least one first bitmap according to the position information, and replacing, with the arranged first bitmap, the bitmap of the at least one initially displayed word which is to be converted.

11. The method according to claim 1, wherein after converting the initial bitmap of the standard word into the target bitmap corresponding to the target font category using the target font conversion model and displaying the target bitmap on the display device page, the method further comprises:

in response to a second font conversion operation on a target font, obtaining an initial bitmap corresponding to the target bitmap;

determining a second font category corresponding to the second font conversion operation in at least one candidate display font category, and determining a second font conversion model corresponding to the second font category in the model library; and converting the initial bitmap into a second bitmap corresponding to the second font category using the second font conversion model, and replacing the target bitmap.

12. The method according to claim 1, wherein an input of the font conversion model is a bitmap corresponding to a standard font, and an output of the font conversion model is a bitmap corresponding to a candidate display font category.

13. A non-transitory computer-readable storage medium having a computer program stored thereon, wherein the program, when executed by a processor, causes the processor to perform:

determining a target font category to be written in response to an operation of a user on a display device page;

determining a target font conversion model corresponding to the target font category in a model library, wherein the model library comprises font conversion models corresponding to a plurality of font categories;

in response to a writing operation of the user on the display device page, determining a standard word corresponding to the writing operation according to a writing trajectory of the writing operation, and generating an initial bitmap corresponding to the standard word; and converting the initial bitmap of the standard word into a target bitmap corresponding to the target font category using the target font conversion model and displaying the target bitmap on the display device page.

14. An electronic device, comprising:

a processor; and a memory for storing one or more programs which, when executed by one or more processors, cause the one or more processors to:

determine a target font category to be written in response to an operation of a user on a display device page;

determine a target font conversion model corresponding to the target font category in a model library, wherein the model library comprises font conversion models corresponding to a plurality of font categories;

in response to a writing operation of the user on the display device page, determine a standard word corresponding to the writing operation according to a writing trajectory of the writing operation, and generate an initial bitmap corresponding to the standard word; and convert the initial bitmap of the standard word into a target bitmap corresponding to the target font category using the target font conversion model and display the target bitmap on the display device page.

15. The electronic device according to claim 14, wherein the processor is configured to:

determine the target font category to be written in response to a selection operation of the user on one category of at least one candidate display font category displayed on the display device page.

16. The electronic device according to claim 14, wherein before responding to the writing operation of the user on the display device page, the processor is configured to:

determine a font size, a font line thickness, a font color and a font inclination angle of the target font category.

17. The electronic device according to claim 14, wherein the processor is configured to:

in response to a word writing operation of the user, perform matching in a standard font file library according to the writing trajectory to find a standard word corresponding to the word writing operation; and generate the initial bitmap of the standard word.

18. The electronic device according to claim 17, wherein the processor is configured to:

obtain a vector outline shape of the standard word from the standard font file library; and perform rendering according to the vector outline shape to obtain the initial bitmap.

19. The electronic device according to claim 15, wherein the processor is further configured to:

in response to an annotation starting operation determine a to-be-annotated area, and displaying a selection interface for the at least one candidate display font category in the to-be-annotated area.

20. The electronic device according to claim 19, wherein the processor is configured to:

in response to a first operation on a font selection interface, present the at least one candidate display font category; and determine the target font category in response to a touch operation on a category on a presentation interface for presenting the at least one candidate display font category.

* * * * *